United States Patent [19]

Sharp

[11] Patent Number: 4,685,327

[45] Date of Patent: Aug. 11, 1987

[54] TOTAL CONTAINMENT STORAGE TANK SYSTEM

[76] Inventor: Bruce R. Sharp, 4090 Rose Hill Ave., Cincinnati, Ohio 45229

[21] Appl. No.: 820,027

[22] Filed: Jan. 21, 1986

Related U.S. Application Data

[63] Continuation-in-part of Ser. No. 740,869, Jun. 3, 1985, Pat. No. 4,607,522, which is a continuation-in-part of Ser. No. 544,013, Oct. 21, 1983, Pat. No. 4,523,454, and a continuation-in-part of Ser. No. 580,800, Feb. 16, 1984, Pat. No. 4,524,609, which is a continuation-in-part of Ser. No. 544,012, Oct. 21, 1983, abandoned, and a continuation-in-part of Ser. No. 745,540, Jun. 17, 1985.

[51] Int. Cl.⁴ ............................................. G01M 3/32
[52] U.S. Cl. ..................................... 73/49.2; 220/469
[58] Field of Search .................. 73/49.2, 49.3, 40.5 R, 73/40; 340/605; 220/466, 469

[56] References Cited

FOREIGN PATENT DOCUMENTS

| 2900960 | 7/1969 | Fed. Rep. of Germany | 73/49.2 |
| 1548526 | 10/1968 | France | 73/49.3 |
| 565999 | 8/1975 | Switzerland | 73/49.2 |

Primary Examiner—Stewart J. Levy
Assistant Examiner—Joseph W. Roskos
Attorney, Agent, or Firm—Charles R. Wilson

[57] ABSTRACT

A storage tank system especially useful for storing liquid gasoline comprises a rigid inner tank having a manhead, a dispensing line extending through the manhead, a sleeve encompassing the manhead, and a jacket encasing the tank and at least part of the sleeve. A leak detector is associated with the closed space between the inner tank and jacket to detect leaks. The system results in a storage facility which is less likely to lose its stored liquid to the environment due to a slow leak or sudden large leak such as is possible with an earthquake and provides total containment capability.

23 Claims, 6 Drawing Figures

TOTAL CONTAINMENT STORAGE TANK SYSTEM

This application is a continuation-in-part of "Storage Tanks Having Secondary Containment Means," Ser. No. 740,869, filed June 3, 1985, now U.S. Pat. No. 4,607,522, which is a continuation-in-part of Ser. No. 544,013 "External Jacket System As Secondary Containment For Storage Tanks," filed Oct. 21, 1983, now U.S. Pat. No. 4,523,454 and Ser. No. 580,800 "Storage Tank Systems," filed Feb. 16, 1984, now U.S. Pat. No. 4,524,609 which is a continuation-in-part of Ser. No. 544,012, filed Oct. 21, 1983, now abandoned and a continuation-in-part of "Fiberglass Reinforced Resin Storage Tanks With Secondary Containment Means," Ser. No. 745,540, filed June 17, 1985.

This invention relates to liquid storage tank systems. More particularly, the invention relates to storage tank systems having total leak prevention means.

BACKGROUND OF THE INVENTION

Various liquids in bulk amounts are stored throughout the world in storage tanks. In particular, storage tanks are used extensively for the storage of liquid gasoline at retail gasoline stations. Necessarily, these stations are in populated areas and, therefore, there is always a danger associated with leaks from the tanks. Leaked gasoline poses a hazard to the environment as well as an obvious health hazard. The known problem is particularly troublesome in that gasoline storage tanks are usually buried underground and any leaks which develop are normally very slow initially. Underground storage tanks are susceptible to damage in those areas that are prone to earthquakes. Typical underground storage tanks are constructed of metal or fiberglass reinforced resinous material. Any earthquake is likely to cause a crack in the tank with a consequent leak. If the leak is slow, the same problems as above discussed exists. If the leak results in a large sudden loss, the problem is readily detected, but only after it is too late.

The problems associated with the present underground storage tanks are well known. Proposed local ordinances and federal regulations are in the drafting stage in an attempt to force the industry to safely store potentially dangerous liquids. Various solutions have been suggested to prevent leaked liquids or adequately contain leaked liquids. For example, some tank manufacturers have produced vaulted tank systems and have advertised them as effective secondary containment storage systems. In a vault system, the rigid storage tank is surrounded by another rigid tank or shell which acts as a containment vessel if the storage tank develops a leak. A slow leak in the storage tank is satisfactorily contained. The drawbacks associated with the vault systems now available include their cost, difficulty in installation due to their excessive weight, and lack of containment of the total system, including access openings and pipeline systems associated therewith.

There has now been discovered a liquid tank storage system which solves many of the problems inherent with the existing systems. The system of this invention is economical and provides total containment of the total system not available previously.

SUMMARY OF THE INVENTION

The present invention is concerned with liquid storage tank systems. The new system comprises (a) a rigid inner tank having a manhead for access to the interior of the tank, (b) a dispensing line extending through the manhead into the interior of the storage tank, (c) a sleeve which encompasses the manhead, said sleeve having a cover and an opening through which the dispensing line passes and (d) a jacket encasing the storage tank and extending at least partially around the sleeve so that a closed space exists between the storage tank and jacket to contain any leakage. Another aspect of the new system additionally has a leak detector means in communication with the closed space. Any leak which occurs in the storage tank is contained within the jacket and is detected by the leak detector means.

DETAILED DESCRIPTION OF THE INVENTION

While the description which follows describes the invention in terms of its use with underground gasoline storage tanks, it should be understood the invention has applicability for other uses as well. For example, storage tanks used for storing liquids other than gasoline can utilize the present invention. However, the invention lends itself particularly well to underground tanks used for storing liquid gasoline and, therefore this preferred use is described in the following paragraphs.

Figure 1:
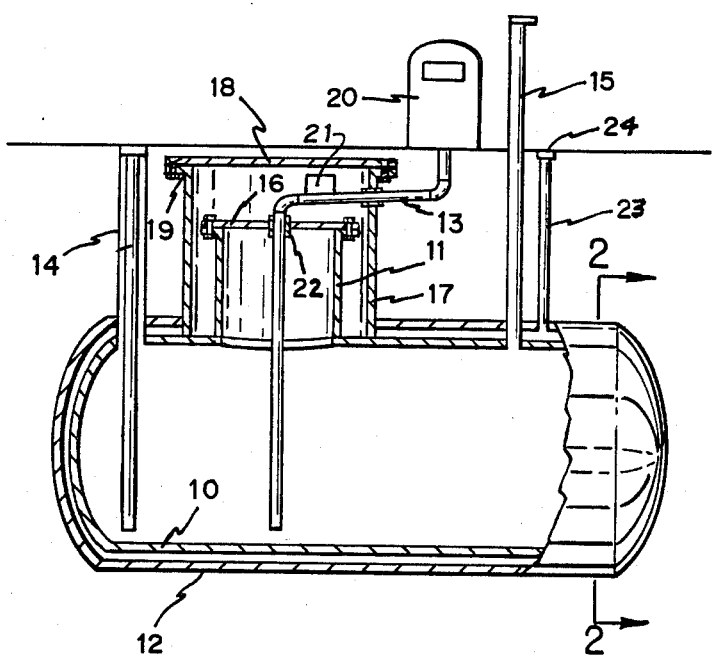
FIG. 1 is a side view, partially in section, of the improved storage tank system.
Figure 2:
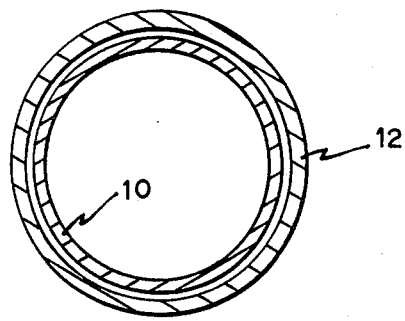
FIG. 2 is a cross-section view taken along lines 2—2 of FIG. 1.

With reference to FIGS. 1 and 2, the present invention comprises a rigid inner tank 10 with manhead 11, a jacket 12 encasing the inner tank 10, and dispensing line 13 extending through the manhead into the storage tank's interior. The rigid inner tank is made of metal such as steel or fibrous reinforced resinous material e.g. a fiberglass reinforced polyester or vinylester material. Such tanks are well known and are commonly used for storage of various liquids. Connected to the inner tank 10 are a fill pipe 14 communicating with the ground surface and vent pipe 15.

Manhead 11 is securely attached to the storage tank. The manhead's primary function is to serve as a means by which access can be gained to the interior of the tank. Removal of cover 16 and disconnecting any lines passing through the cover will allow an individual to enter the tank for repair or inspection purposes. As a secondary function, the manhead provides a means by which the various access lines enter the tank. The manhead is generally cylindrical in shape and about one to three feet in diameter, though other shapes and dimensions can be utilized. The cover 16 is securely fastened, preferably in liquid tight fashion by known attachment means, e.g. bolts and nuts.

Sleeve 17 extends around and encloses manhead 11. The sleeve is preferably cylindrical in shape but can be other shapes as well and extends about twelve inches to about forty-eight inches above the inner tank 10. It is securely attached to the storage tank 10, e.g. by welding or fiberglassing. Sleeve 17 and its cover 18 resting on flange 19 allow for total containment of the storage tank system. As discussed below, jacket 12 at least extends to and can partially enclose the sleeve. In effect the storage tank and the sides of the manhead are encased with the jaket and sleeve.

Dispensing line 13 is used for withdrawing gasoline and delivering it to the consumer through gasoline dispenser 20. A pump is positioned within the inner tank, dispensing line or gasoline dispenser for pumping gasoline to the dispenser. As shown in FIG. 1, submerged pump 21 is positioned in the area encompassed by the sleeve. This allows ready access to the pump for maintenance. Bushing 22 is provided where the dispensing line extends through the cover 16. The bottom of the dispensing line 13 is in close proximity with the bottom of the inner tank 10. The vent pipe 15 is optional, though preferred, and merely provides means by which gasoline vapors resulting primarily from a filling operation can be vented to the atmosphere. It also prevents a vacuum from occurring when the tank is emptied. The opening to the atmosphere is normally substantially off ground level for safely reasons. All the aforementioned pipes and lines are securely attached to the rigid inner tank by known means.

The fill pipe 14 provides as its obvious function the means by which gasoline can be pumped into the inner tank from an outside source, e.g. a tank truck. The fill pipe can comprise an inner line through which gasoline flows to the inner tank 10 and an open space within the fill pipe which acts as a vapaor recovery line. As gasoline is pumped into the inner tank, gasoline vapaors which are formed are sucked through the space back to the tank truck for recovery. This reduces the amount of gasoline vapors which would otherwise be vented to the atmosphere or remain in the inner tank preventing the tank from being filled completely with gasoline. As used throughout here, the term "fill pipe" connotes the pipe by which gasoline is pumped to the tank; it can be single pipe, but more often has vapaor recovery means associated with its end near the bottom.

Jacket 12 is constructed of a rigid or flexible material of sufficient strength to contain the gasoline in case of a leak. The jacket can be made of a steel or a synthetic polymeric material, including an elastomeric material such as rubber, e.g. Buta-n, neoprene, and fluoroelastomer, e.g. Viton, polyester, vinyl esters, polyethylene (preferably a low density polyethylene), polypropylene, polyvinylchloride, polyurethane, polyepoxie and various fiber reinforced, fabric and vinyl backed sheets of any of the foregoing materials as well as material constructed of two or more of the foregoing materials, e.g. fluoroelastomer coated polyethylene. Fiberglass reinforced polyesters and vinyl esters are two preferred jacket materials. The listed materials used in construction of the jacket are not all inclusive, but only illustrative of some of the materials that can be used. Preferably, the jacket is made of at least one material which is gasoline impervious.

The shape of the jacket 12 is such that it encases the rigid inner tank 10 to form a closed space between said jacket and the inner tank. Preferably, the jacket is sized to hold up to 200% of the inner tank's contents. Additionally, jacket 12 at least extends to sleeve 17. Preferably, jacket 12 extends to the top rim of the sleeve and is secured thereto. As discussed more fully below, any leakage from the storage tank or manhead will be contained by the jacket.

The space between the inner tank 10 and the jacket 12 is closed. Any leak through the storage tank will be contained by the jacket. In a preferred embodiment of this invention a leak detection means is in communication with the closed space to monitor for leakage through either the storage tank or jacket. Several different types of detection means can be used, including liquid level detectors, pressure change detectors, gas or liquid analyzers, and electronic probes. The detection means itself is preferably positioned within the sleeve for ready accessibility. The detection means can be periodically checked or it can be electronically connected to a remote receiving station for continuous monitoring. The detection means shown in FIG. 1 comprises a detecting liquid which completely fills the closed space and extends into standpipe 23 and a sight glass 24 associated with the standpipe to allow for easy observation of the liquid. Thus, any leak in the inner tank will cause a migration of detecting liquid into the tank or, less likely, gasoline into the closed space. A loss of liquid into the tank will result in a drop of the level of liquid in the standpipe. Migration of gasoline into the closed space is also detected by observation. For this purpose, the detecting liquid can be dyed a contrasting color for easier observation. The sight glass is shown in FIG. 1 as being at ground level; it will be appreciated the sight glass can just as easily be at a more convenient location, such as in the gasoline station. In colder climates the detecting liquid must be freeze-proof. Thus, the liquid must have a freezing point below that normally experienced or, if water (the preferred detecting liquid) have a sufficient quantity of anti-freeze added to it. Alternatively, the detecting liquid can fill the space between the inner tank and outer jacket, but not extend above the freeze line in the standpipe. Sufficient air pressure or vacuum can be used in the space above the detecting liquid and means for detecting a change in pressure can be used for warning of a leak. A vacuum is preferred in the space above the detecting liquid.

Non-visual leak detection means can also be used in conjunction with the detecting liquid. For example, the leak detection means can be based on detecting a predetermined change of pressure associated with a drop in detection liquid level. Differential pressure switches and transducers are examples of means which are capable of detecting a change of pressure and transmitting in into an audible or visual signal. As another example, float switches which detect a change of level of liquid by movement of a float can transmit the detected change into a signal. Optic devices are also known which can be used for non-visual leak detection of the detecting liquid level. Still another detection means in based on a set of conductive points positioned in the detecting liquid and wired so that a change in the detecting liquid level will interrupt an electric circuit and set off an alarm.

A non-visual means which does not operate on a change of level of detecting liquid uses a probe positioned within the closed space occupied by the detecting liquid. The probe is capable of detecting preselected liquids, e.g. gasoline. Various probes are known. In one type, electric wires are encased in a gasoline-soluble covering. Leaked gasoline into the closed space will eventually dissolve the covering and cause a current in the wires to short circuit.

Another leak detection means in communication with the closed space between the inner tank and jacket utilizes non-atmospheric air pressure throughout the closed space. Such detection means associated with the closed space between the inner tank and jacket is capable of detecting any change in pressure resulting from a leak in the jacket or inner tank. Conventional air pressure or a vacuum means is used for providing a positive or negative pressure. The use of air pressure with a flexible jacket is not preferred because the jacket may be gas permeable to a certain degree and loss of pressure because of this must be compensated for. When a vacuum is used, reinforcing means are used to maintain a spaced relationship between the tank and flexible jacket. A gas pervious material, for example a continuous foraminous or porous matting can be placed within the space to maintain the spaced relationship. Jute, polyurethane foam, fiberglass matting, cotton matting, nylon matting and asbestos are examples of materials which can be used.

Figure 3:
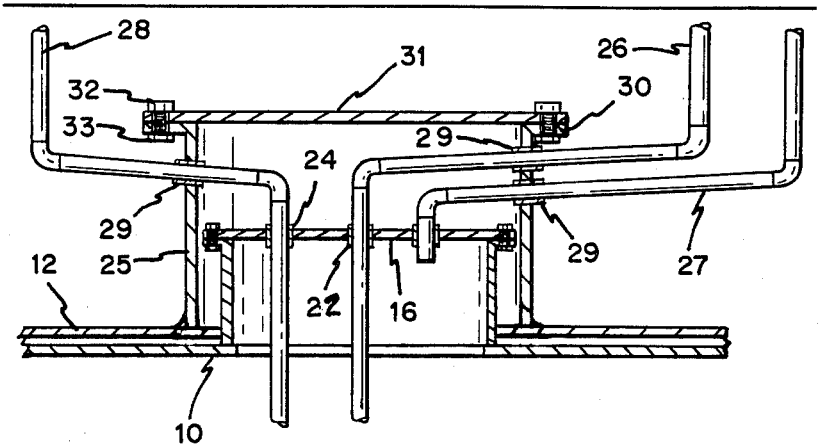
FIG. 3 is a side view, partially in section, of a storage tank system wherein all access lines are directed through the tank's manhead.

FIG. 3 is a partial view of another embodiment of this invention. Sleeve 25 attached to rigid jacket 12 has dispensing line 26, vent pipe 27, and fill pipe 28 extending through its side walls. Fittings 29 are positioned in the side walls to accommodate the lines and pipes. A prime advantage achieved by having all the lines and pipes entering the inner tank through the sleeve and manhead is the elimination of openings at other points in the inner tank with consequent access and leakage problems. Detection of the leaks in lines and pipes, as more fully discussed later, is also easier when they all enter the sleeve prior to entering the inner tank. The sleeve has a flange 30 with bolt holes extending from its top surface. Cover 31 fits over the flange 30. Bolts 32 extend through aligned holes in the cover 31 and flange 30. Nuts 33 securely hold the cover 31 onto the sleeve 25. If a liquid seal is desired, a gasket between the flange and cover can be used. Other known attachment means can be used for securing the cover to the sleeve.

Figure 4:
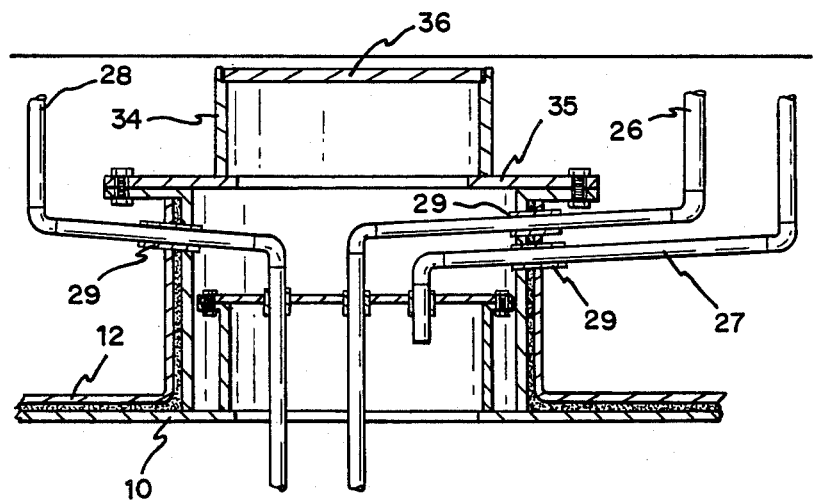
FIG. 4 is a side view, partially in section, of an embodiment of the invention wherein a second manhead is positioned above a first manhead.

FIG. 4 illustrates an embodiment of the invention wherein a second manhead is positioned on the sleeve. Cover 35 has a hole cut in its interior portion. The second manhead 34 permits easier access to the interior of the sleeve to service the lines, service the pump, and/or check for leakage. Manhead 34 has a maximum cross-section dimension ranging from about eight inches to about forty inches. It can be any shape, though a cylindrical shape is preferred. It is attached to cover 35 by any suitable means, e.g. welds. The second manhead 34 can extend from the cover 35 to ground level, though generally it extends from the cover 35 to about a foot below ground level so as to lessen the ground forces exerted through it to the inner tank 10. The second manhead also has a cover 36. Cover 36 rests in a recess extending around the inner dimension of the sleeve 34 as shown in FIG. 4 or is bolted to a flange extending from the manhead 34. Sealing means such as a gasket or O-ring can be used if a liquid tight seal is desired.

As shown in FIG. 4, the jacket 12 extends up to the top of the sleeve 25. As a result, the total inner tank 10 and sleeve 25 to its cover is encompassed by the jacket 12. The leak detection means in communication with closed space between the inner tank and jacket is thus capable of monitoring the tank system, including the inner tank 10 and manhead 11. Gas pervious material 37 is used between the inner tank and jacket to maintain a spaced relationship in those situations where needed, e.g. when jacket 12 is made of a flexible material.

Figure 5:
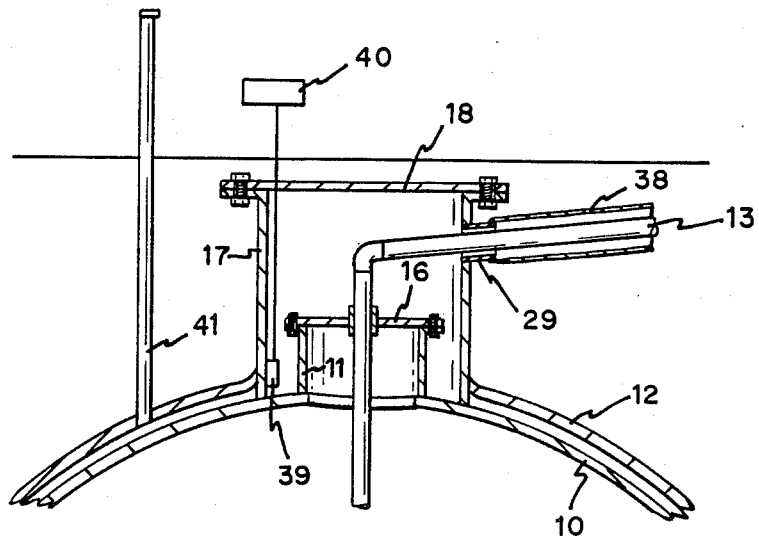
FIG. 5 is a side view, partially in section of a storage tank system using a monitor means positioned within the sleeve and containment means for the dispensing line.

Still another embodiment of the invention uses at least one additinal flexible jacket to encase dispensing line 13. As shown in FIG. 5, dispensing line 13 extends through the side wall of sleeve 17. Surrounding the dispensing line is a jacket 38. Jacket 38 completely encases the dispensing line and extends from the point it enters sleeve 17 through fitting 29 to the point it connects to the dispenser 20. Similar to the jacket 12 surrounding the storage tank, jacket 38 contains any leakage from the dispensing line 13. If a leak does occur, it will be directed by gravity to the manhead area where it is effectively contained and detected. The material and mode of operation for the jacket encasing the inner tank applies as well to the jacket encasing the dispensing line. A leak detection means 39 is positioned in the area encompassed by the sleeve 17. Any leakage which occurs through the manhead 11 or dispensing line 13 (which is contained by jacket 38 and directed by gravity into the sleeve) will be detected and conveyed to receiving means 40. The leak detection means can be any means capable of detecting the leaked liquid, e.g. a gas analyzer or probe. Optionally, an alarm means can sound an audible or visual alarm when activated. The closed space between the inner tank 10 and jacket 12 is also monitored through access tube 41 in a manner discussed above with reference to FIG. 1 and the disclosed alternative leaked detection means.

Figure 6:
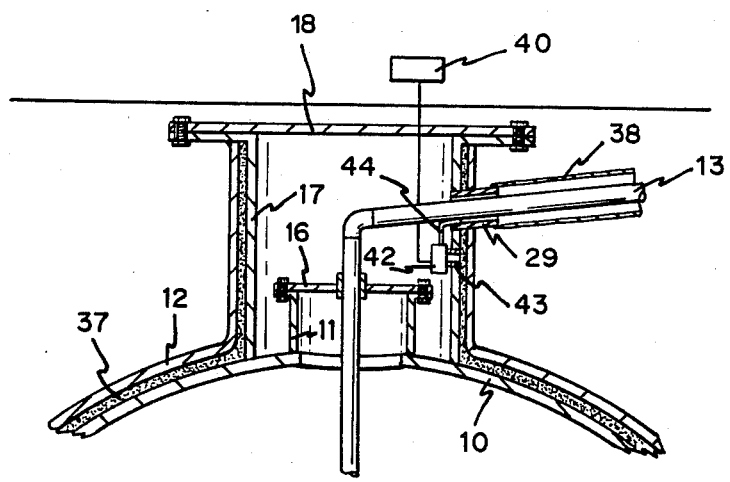
FIG. 6 is a side view, partially in section, of a storage tank system wherein one leak detection means is used to monitor for leakage in the storage tank or dispensing line.

FIG. 6 illustrates the use of a leak detection means 42 which is capable of simultaneously monitoring (1) the closed space between the inner tank 10 and jacket 12 and (2) the closed space between the dispensing line 13 and jacket 38. The system of FIG. 6 comprises storage tank 10, sleeve 17, jacket 12 encasing the storage tank and sleeve, and gas pervious 37 between the jacket and the storage tank and sleeve to maintain a spaced relationship therebetween. Dispensing line 13 extends through sleeve 17, manhead cover 16 and into the storage tank. A jacket 38 encases dispensing line 13. A leak detection means 42 is positioned within the sleeve. Access line 43 and 44 lead to the respective closed spaces. Any leakage in the inner tank, dispensing line or their jackets will be detected by the leak detection means 42 and relayed to receiving means 40. Leak detection means 42 can be any detection means capable of detecting the stored liquid, such as that described above.

It should be apparent that several obvious variations of the invention described herein are possible. All such variations are within the scope of the claims.

What is claimed is:

1. A storage tank system having total secondary containment means comprised of:
    (a) a rigid inner storage tank having a manhead for access to the interior of the tank;
    (b) a sleeve attached to the rigid storage tank which encompasses the manhead, said sleeve having a cover which forms a water-tight seal and an opening through which a dispensing line passes;
    (c) a dispensing line extending through the opening in the sleeve in a sealed fashion and then through the storage tank to the interior thereof for dispensing liquid from the storage tank;
    (d) a jacket encasing the storage tank and extending at least to the sleeve so that a closed space exists between the storage tank and jacket whereby any leakage which occurs through the storage tank or manhead will be contained by the jacket and/or sleeve; and (e) a leak detection means in communication with the closed space between the storage tank and jacket.

2. The storage tank system of claim 1 wherein the jacket is made of a flexible material.

3. The storage tank system of claim 2 wherein the jacket is made of a synthetic polymeric material.

4. The storage tank system of claim 3 wherein the jacket is made of a fibrous reinforced resinous material.

5. The storage tank systems of claim 4 wherein the jacket is made of a fiberglass reinforced polyester material.

6. The storage tank system of claim 1 wherein the jacket is rigid.

7. The storage tank system of claim 6 wherein the jacket is made of steel.

8. The storage tank system of claim 6 wherein the jacket is made of a fiberglass reinforced resinous material.

9. The storage tank system of claim 1 wherein the sleeve extends from about 12 inches to about forty-eight inches above the top of the manhead.

10. The storage tank system of claim 9 wherein the dispensing line extends through the manhead.

11. The storage tank system of claim 1 wherein the jacket completely encases the storage tank and the sleeve.

12. The storage tank system of claim 1 further comprising a second manhead positioned on the cover of the sleeve, said second manhead comprised of a side portion extending from the cover of the sleeve toward the ground surface above the storage tanks and having a maximum cross-section dimension ranging from about eight inches to about forty-eight inches and a cover allowing for ready access to the interior of the sleeve.

13. The storage tank system of claim 12 further wherein the cover on the second manhead forms a water-tight seal.

14. The storage tank system of claim 25 further comprising a detection means in communication with the space encompassed by the sleeve.

15. The storage tank system of claim 14 further comprising a jacket around the dispensing line at the point where the dispensing line exits the sleeve and extending to a dispenser such that any leakage from the dispensing line will be contained within the jacket and directed towards the area encompassed by the sleeve.

16. The storage tank system of claim 15 wherein the jacket is flexible.

17. The storage tank system of claim 15 wherein the leak detection means monitors for leakage into the closed space between the storage tank and its jacket and for leaking into a closed space between the dispensing line and a jacket positioned around the dispensing line at the point it extis the sleeve and extending to a dispenser.

18. The storage tank system of claim 1 wherein a detecting liquid is found in the closed space between the storage tank and jacket and the leak detection means is capable of detecting any change in level of detecting liquid.

19. The storage tank system of claim 1 wherein a gas permeable material is used to maintain a spaced relationship between the storage tank and jacket.

20. The storage tank systems of claim 1 wherein a non-atmospheric pressure is maintained in the closed space and a pressure change detector is used as the leak detection means.

21. The storage tank system of claim 1 further wherein a fill line extends through the manhead and into the storage tank.

22. The storage tank system of claim 21 further wherein a vent line extends throughout the manhead and into the storage tank.

23. The storage tank of claim 1 further wherein a fill line and a vent line extend through the sleeve and into the rigid storage tank.

* * * * *